UNITED STATES PATENT OFFICE.

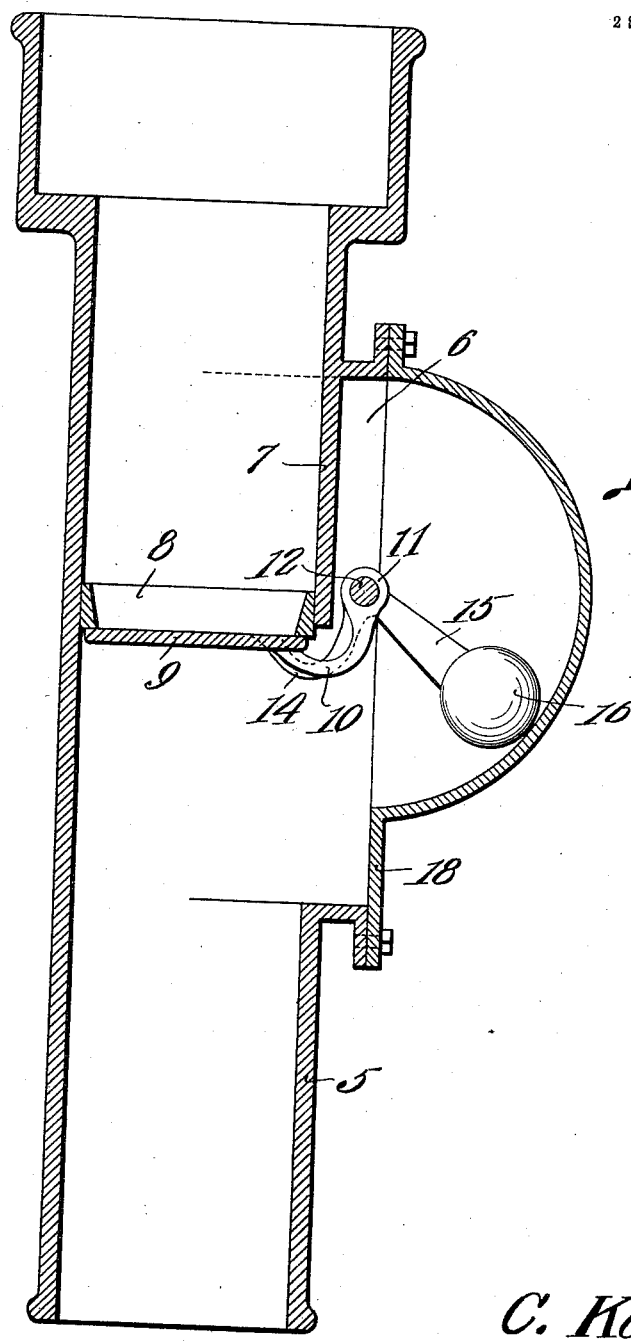

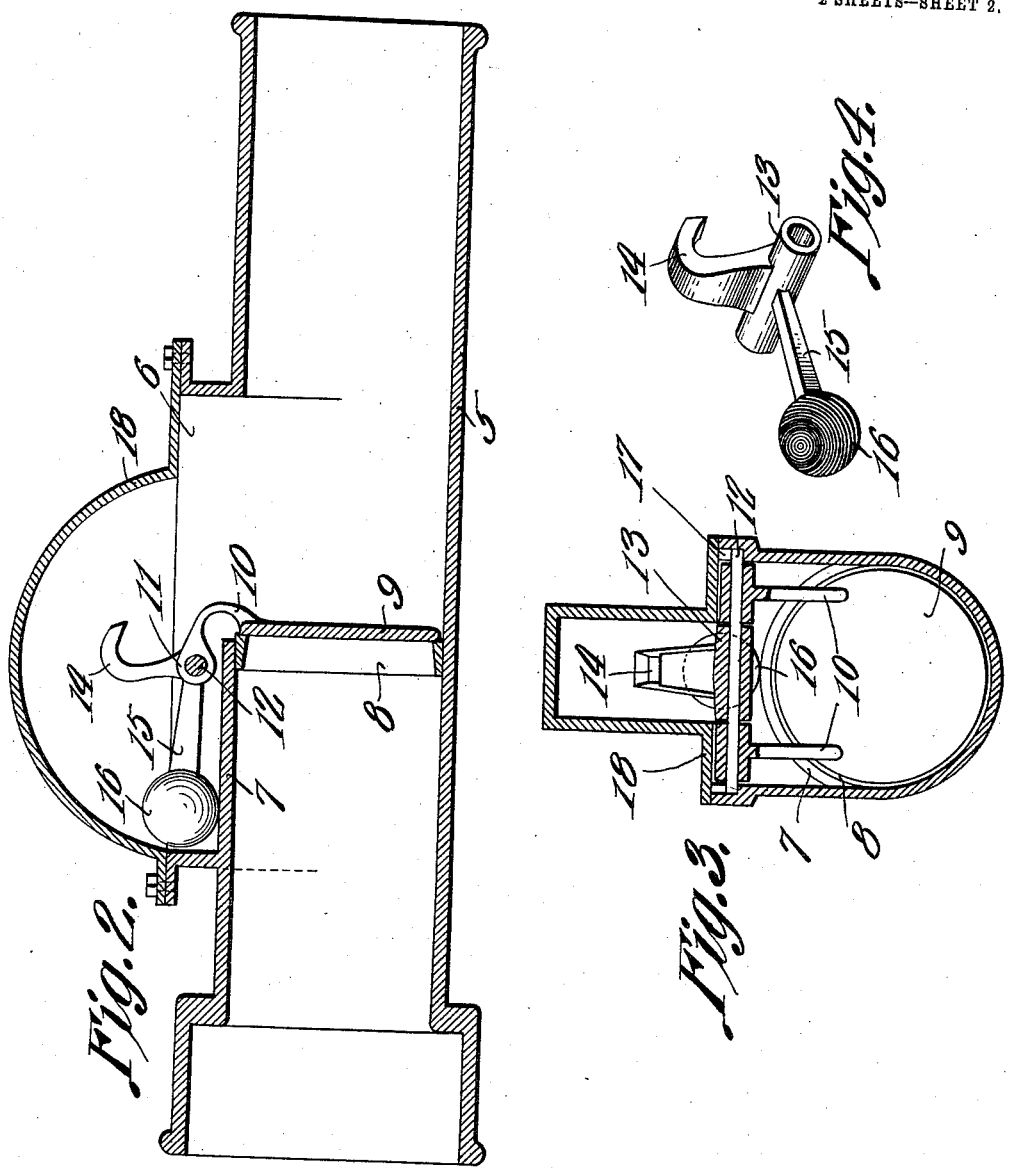

CHARLES KELTY AND DAVID P. JORALEMON, OF ELMIRA, NEW YORK.

SEWER-TRAP.

1,018,569. Specification of Letters Patent. Patented Feb. 27, 1912.

Application filed January 26, 1911. Serial No. 604,846.

*To all whom it may concern:*

Be it known that we, CHARLES KELTY and DAVID P. JORALEMON, citizens of the United States, residing at Elmira, in the county of Chemung, State of New York, have invented a new and useful Sewer-Trap, of which the following is a specification.

It is the object of the present invention to provide an improved sewer trap and the invention aims particularly to provide a sewer trap so constructed that it will act effectually to prevent the escape of accumulated gases, regardless of the position in which it is placed.

In this connection, the invention aims to so construct the trap that it may be positioned at any desired angle and will effectually perform its function without requiring any change in structure at the time it is installed.

To this end, the invention contemplates the provision, in a trap of this class, of a valve and a counter weight for the valve which may or may not be effective depending entirely upon the position of the trap as a whole.

In the accompanying drawings—Figure 1 is a vertical sectional view through a sewer trap constructed in accordance with the present invention, the trap being illustrated as arranged vertically. Fig. 2 is a similar view through the trap but showing the same arranged horizontally. Fig. 3 is a vertical transverse sectional view through the trap in a plane directly in advance of the valve, parts in a vertical plane with the pivot for the valve being, however, also shown in section. Fig. 4 is a detail perspective view of the counter weight for the valve, removed.

In the drawings, the trap is illustrated as consisting, in part, of a casing 5 which is preferably in the form of a short length of pipe designed to be interposed in the soil pipe. At a point between its ends, this pipe is enlarged as at 6 and is formed with a cylindrical projection 7 extending into the enlargement. At its end, this projection is provided with a packing ring or gasket 8 which forms a seat for the valve of the trap, indicated by the numeral 9. This valve is formed with lugs 10 which are arcuate and are pivotally mounted as at 11 upon a pivot pin 12 which extends transversely of the enlarged portion of the pipe section at a point inwardly of the projection 7 of the casing. In this manner, the valve 9 is so mounted as to swing toward and away from the seat 8. It will be observed, by referring to Fig. 2 of the drawings, that owing to the fact that the pivot for the valve is located inwardly of the ends of the projection 7, the valve will seat by gravity when the trap is arranged bodily in a horizontal or substantially horizontal position. As heretofore stated, however, it is contemplated that the trap shall be arranged to have its valve rest normally closed regardless of the position of the trap and for this purpose there is provided a counter weight for the valve which acts to properly seat the valve when the same will not seat by gravity owing to the position of the trap as a whole.

The counter weight mentioned above embodies a sleeve or hub 13 fitted pivotally upon the pin 12 and this sleeve is arranged to oscillate upon the pin independently of the pivot lugs for the valve 9. Integral with the sleeve and projecting therefrom is an arcuate finger 14 and an arm 15 which projects substantially at right angles with respect to the finger 14 and at its end is formed with a weight 16. When the trap is arranged in a horizontal or substantially horizontal position, or in other words when the trap is so positioned that its valve 9 will seat by gravity, the weight 16 rests upon the upper side of the projection 7 with the finger 14 upstanding in the position shown in Fig. 2 of the drawings. When however the trap is arranged vertically, the weight 16 will assume about the position shown in Fig. 1 of the drawings whereupon the extremity of the curved finger 14 will be brought to bear against the outer face of the valve 9 and the valve will be held normally against its seat.

In mounting the pivot pin 12 in the casing or pipe section of the trap, the walls of the enlarged portion 6 of the pipe section are formed at opposite points with recesses 17 in which the ends of the pin are seated. A cap 18 is secured upon the open side of this enlargement and serves to close the same and to retain the pin in place. Furthermore this cap is so formed as to permit of swinging movement therein of the counter weight. From the foregoing description it will be observed that the valve 9 will normally rest against the seat 8 regardless of the position of the trap as a whole and that it will so seat without any change in the arrangement of the parts of the trap being necessary.

What is claimed is:

In a sewer trap, a seat disposed diametrically thereof, a pivot pin arranged exteriorly of and one side of the seat, a valve having two curved arms pivoted to said pin to swing the valve clear of the trap at the seat and for coöperating with said seat, a counter weight, a sleeve pivoted to the pin between the arms and movable independently of the valve, the counter weight being connected to said sleeve, and a curved finger of substantially the same length as the arms of the valve formed integral with the sleeve and arranged to engage with the outer face of the valve, whereby the said valve between the arms is held seated.

In testimony that we claim the foregoing as our own, we have hereto affixed our signatures in the presence of two witnesses.

CHARLES KELTY.
DAVID P. JORALEMON.

Witnesses:
WM. POWELL,
NELLIE B. KINGSTON.

Copies of this patent may be obtained for five cents each, by addressing the "Commissioner of Patents, Washington, D. C."